United States Patent
Jeong et al.

(10) Patent No.: US 9,793,742 B2
(45) Date of Patent: Oct. 17, 2017

(54) WIRELESS CHARGING DEVICE INCLUDING A CASE PART AND A POWERLESS SUPPLY PART

(71) Applicant: Samsung Electro-Mechanics Co., Ltd., Suwon-si (KR)

(72) Inventors: In Wha Jeong, Suwon-si (KR); Jong Heum Park, Suwon-si (KR); Hugh Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 153 days.

(21) Appl. No.: 14/664,637

(22) Filed: Mar. 20, 2015

(65) Prior Publication Data
US 2016/0105055 A1    Apr. 14, 2016

(30) Foreign Application Priority Data
Oct. 10, 2014    (KR) .................. 10-2014-0136696

(51) Int. Cl.
H02J 7/00    (2006.01)
H02J 7/02    (2016.01)
H02J 50/05    (2016.01)
H02J 50/10    (2016.01)

(52) U.S. Cl.
CPC ............ H02J 7/025 (2013.01); H02J 7/0044 (2013.01); H02J 50/05 (2016.02); H02J 50/10 (2016.02)

(58) Field of Classification Search
CPC .......... H02J 7/0044; H02J 7/025; H02J 50/10; H02J 50/05

USPC .......................................................... 320/108
See application file for complete search history.

(56) References Cited

U.S. PATENT DOCUMENTS

| | | | | |
|---|---|---|---|---|
| 6,701,185 B2 * | 3/2004 | Burnett | ............... | A61N 1/36071 607/149 |
| 2011/0241615 A1 * | 10/2011 | Yeh | ........................ | H02J 7/0027 320/108 |
| 2012/0146431 A1 * | 6/2012 | Ichikawa | ................. | H02J 7/025 307/149 |
| 2013/0099730 A1 * | 4/2013 | Yoon | ...................... | H05K 1/165 320/108 |
| 2015/0205750 A1 * | 7/2015 | Hendin | ............... | G06F 13/4221 713/155 |
| 2016/0064944 A1 * | 3/2016 | Hatanaka | ................ | H01F 38/14 307/104 |
| 2016/0141884 A1 * | 5/2016 | Lee | ......................... | H02J 17/00 307/104 |

(Continued)

FOREIGN PATENT DOCUMENTS

| JP | 2010-273332 A | 12/2010 |
|---|---|---|
| JP | 5035477 B1 | 7/2012 |

(Continued)

*Primary Examiner* — Nathaniel Pelton
(74) *Attorney, Agent, or Firm* — NSIP Law

(57) ABSTRACT

There is provided a wireless charging device including: a case part including at least two case portions which are configured to be overlapped with each other; and a power supply part including power supply units disposed in the case portions, respectively, wherein when the case portions are overlapped with each other, power supply electrodes of the power supply units are disposed to be overlapped with each other in the same direction, so as to charge at least one target object.

12 Claims, 9 Drawing Sheets

(56) References Cited

U.S. PATENT DOCUMENTS

2016/0156228 A1\* 6/2016 Van Den Biggelaar ... H02J 50/05
307/104

FOREIGN PATENT DOCUMENTS

| KR | 20-2013-0000358 U | 1/2013 |
| WO | WO 2010/150317 A1 | 12/2010 |

\* cited by examiner

WIRELESS CHARGING DEVICE INCLUDING A CASE PART AND A POWERLESS SUPPLY PART

CROSS-REFERENCE TO RELATED APPLICATION

This application claims the priority and benefit of Korean Patent Application No. 10-2014-0136696 filed on Oct. 10, 2014, with the Korean Intellectual Property Office, the disclosure of which is incorporated herein by reference.

BACKGROUND

The present disclosure relates to a wireless charging device.

There has been recent consumer demand for relatively large mobile devices such as smartphones having large screens, and thus, a relatively large amount of power is consumed. Consequently, users of such mobile devices need to frequently charge the batteries thereof, and accordingly, a device simplifying the charging of such mobile device is required.

Further, recently, the capacity of batteries has been gradually increased due to high power consumption in some devices, as mentioned above, and the charging of batteries takes a greater length of time, due to the increased capacity of such batteries.

Therefore, demand for rapid charging schemes allowing for faster charging of the batteries of such devices has increased.

Consequently, a charging device allowing for simplified charging of mobile devices while being portable at the same time is required. Further, a charging device capable of performing a rapid charging is required.

RELATED ART DOCUMENT (Patent Document 1) Japanese Patent Publication No. 5035477

SUMMARY

An aspect of the present disclosure may provide a wireless charging device having portability and improved charging efficiency.

According to an aspect of the present disclosure, a wireless charging device may include: a case part including at least two case portions which are configured to be overlapped with each other; and a power supply part including power supply units disposed in the case portions, respectively, wherein when the case portions are overlapped with each other, power supply electrodes of the power supply units are disposed to be overlapped with each other in the same direction, so as to charge at least one target object.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
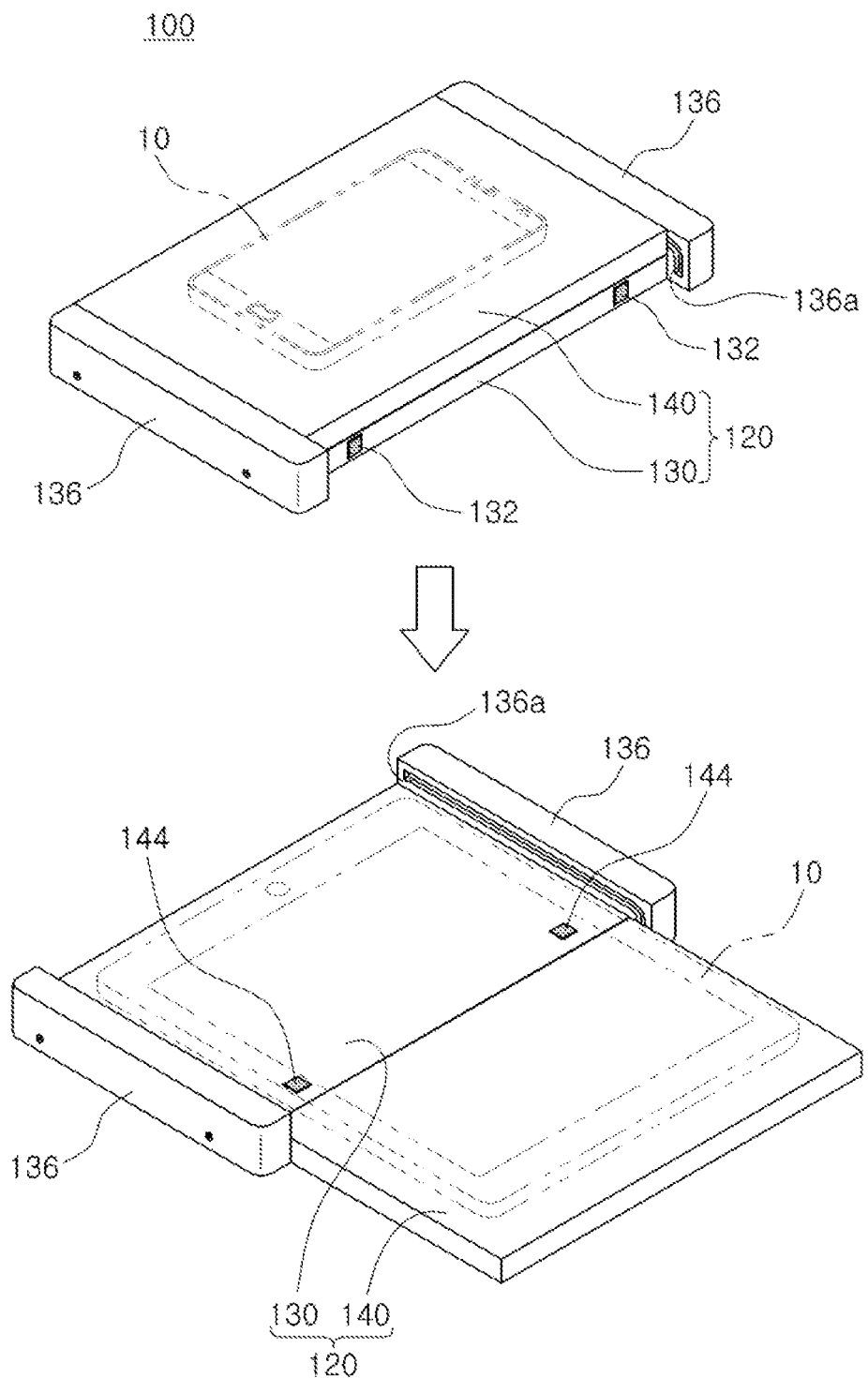
FIG. 1 is a schematic perspective view of a wireless charging device including a case part according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

Figure 2:
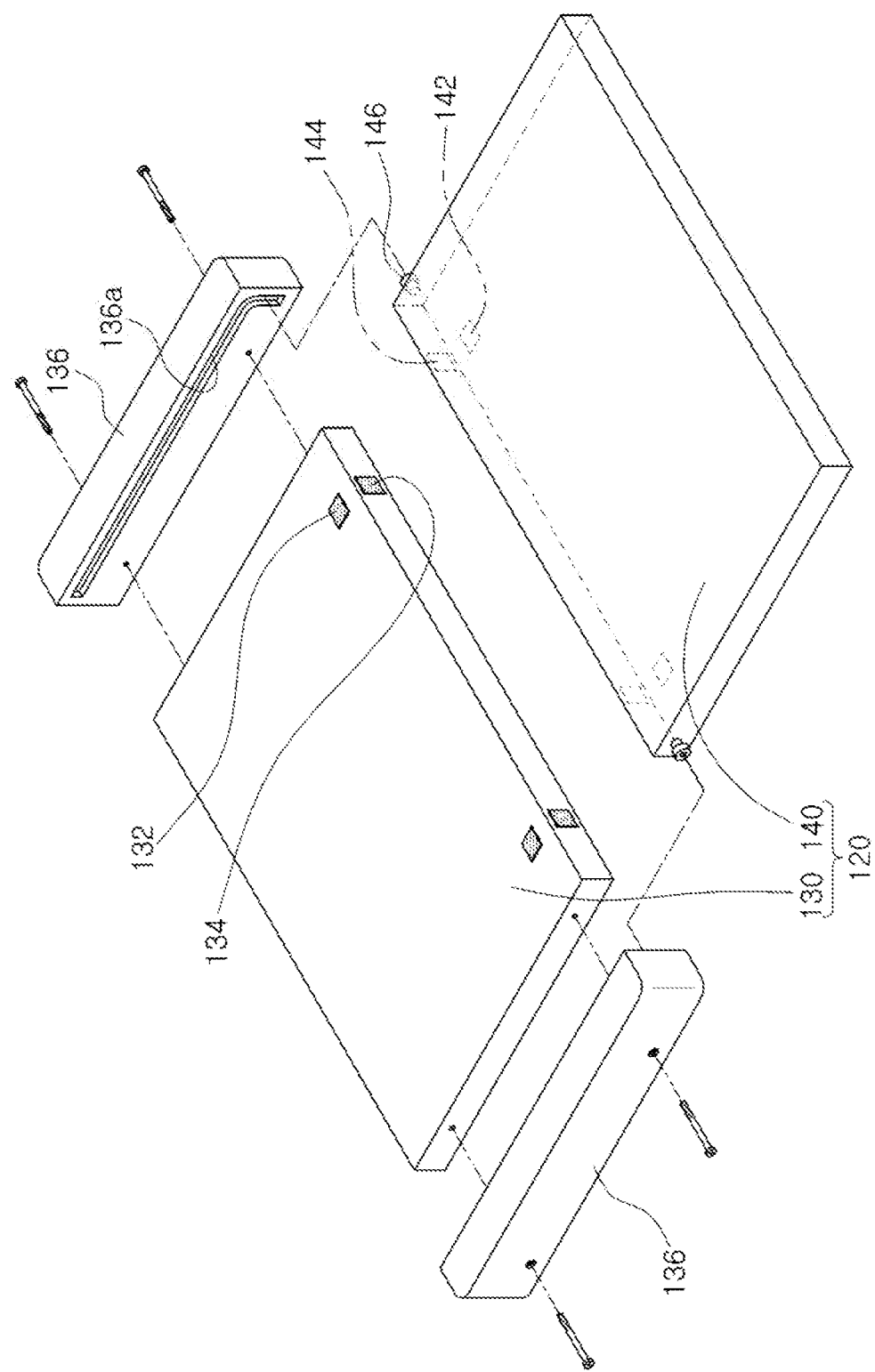
FIG. 2 is an exploded perspective view of a wireless charging device including a case part according to an exemplary embodiment of the present disclosure.
Figure 3:
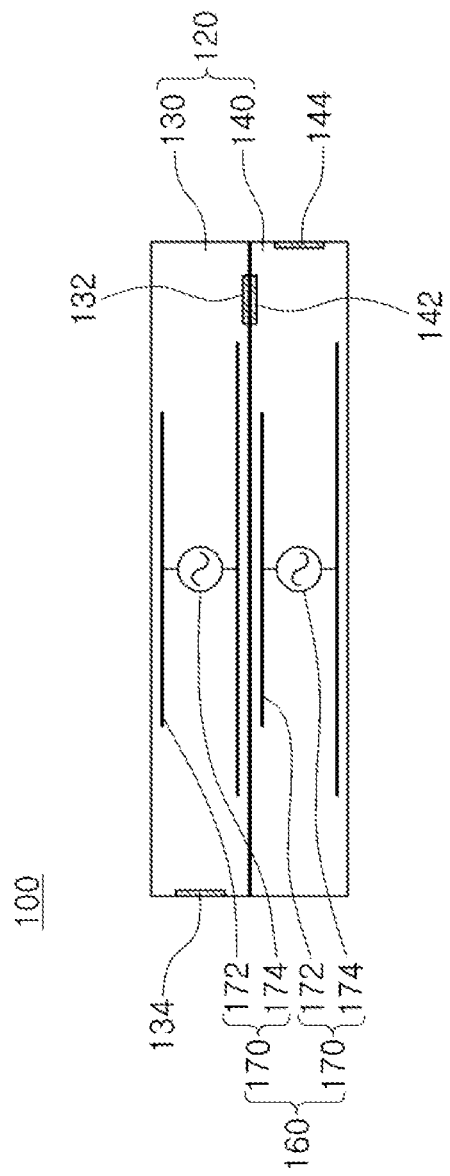
FIG. 3 is a configuration view of a wireless charging device according to an exemplary embodiment of the present disclosure.

FIG. 1 is a schematic perspective view of a wireless charging device including a case part according to an exemplary embodiment of the present disclosure, FIG. 2 is an exploded perspective view of the wireless charging device including the case part according to an exemplary embodiment of the present disclosure, and FIG. 3 is a configuration view of the wireless charging device according to an exemplary embodiment of the present disclosure.

Referring to FIGS. 1 through 3, a wireless charging device 100 according to an exemplary embodiment of the present disclosure may include a case part 120 and a power supply part 160 (see FIG. 3), by way of example.

The case part 120 may include at least two case portions, wherein the case portions are configured to be overlapped with each other.

By way example, the case part 120 may include first and second case portions 130 and 140. That is, the case part 120 may include the first case portion 130 in which a connection wire (not shown) for making a connection with an external power source is installed, and the second case portion 140 coupled to be slidable and movable with respect to the first case portion 130.

The first case portion 130 may have an internal space in which a component configuring the power supply part 160 may be installed. In addition, a top surface of the first case portion 130 may be formed to be flat so that at least one of target objects (e.g., smartphones, tablet PCs, and the like) to be charged may be seated and installed. By way example, the first case portion 130 may have a rectangular parallelepiped shape.

Meanwhile, when the second case portion 140 is disposed on the first case portion 130 so as to be overlapped with the first case portion 130, the top surface of the first case portion 130 may be provided with a first connection electrode 132 to form an electrical connection with the second case portion 140.

In addition, when the second case portion 140 is disposed to be in parallel to the first case portion 130, one side surface of the first case portion 130 may be provided with a second connection electrode 134 to form an electrical connection with the second case portion 140.

That is, when the second case portion 140 is disposed on the first case portion 130, the first and second case portions 130 and 140 may be electrically connected to each other through the first connection electrode 132, and when the first case portion 130 and the second case portion 140 are disposed to be in parallel to each other, the first and second case portions 130 and 140 may be electrically connected to each other through the second connection electrode 134.

In addition, both side surfaces of the first case portion 130 may be provided with guide bars 136 for a slidable movement of the second case portion 140. In addition, the guide bar 136 may have a guide groove 136a which is formed in a length direction of the first case portion 130.

The second case portion 140 may also have an internal space in which a component configuring the power supply part 160 may be installed. In addition, a top surface of the second case portion 140 may also be formed to be flat and the second case portion 140 may have a rectangular parallelepiped shape, by way of example. In addition, the first and second case portions 130 and 140 may have the same size and shape as each other.

Meanwhile, the second case portion 140 may be provided with first and second connecting electrodes 142 and 144 corresponding to the first and second connection electrodes 132 and 134 of the first case portion 130 described above. That is, when the first case portion 130 is disposed to be overlapped with the second case portion 140 under the second case portion 140, a bottom surface of the second case portion 140 may be provided with the first connecting electrode 142 connected to the first connection electrode 132 of the first case portion 130.

In addition, when the first case portion 130 is disposed to be in parallel to the second case portion 140, one side surface of the second case portion 140 may be provided with the second connecting electrode 144 connected to the second connection electrode 134 of the first case portion 130.

In addition, when the first case portion 130 and the second case portion 140 are disposed to be overlapped with each other, the first and second case portions 130 and 140 may be electrically connected to each other through the first connection electrode 132 and the first connecting electrode 142, and when the first case portion 130 and the second case portion 140 are disposed to be in parallel to each other, the first and second case portions 130 and 140 may be electrically connected to each other through the second connection electrode 134 and the second connecting electrode 144.

In addition, the second case portion 140 may be provided with a protrusion 146 which is moved along the guide groove 136a of the above-mentioned guide bar 136. That is, the protrusion 146 is moved along the guide groove 136a, such that the second case portion 140 may be moved while sliding the first case portion 130.

The power supply part 160 may include power supply units 170 which are provided to each of the case portions 130 and 140.

The power supply units 170 configuring the power supply part 160 may include power supply electrodes 172 disposed on portions which are directly under the top surfaces of the first and second case portions 130 and 140. Meanwhile, when the first and second case portions 130 and 140 are disposed to be overlapped with each other, the power supplying electrode 172 included in the first case portion 130 and the power supplying electrode 172 included in the second case portion 140 are disposed to be overlapped with each other in the same direction.

In addition, the power supply unit 170 may include an alternating voltage generating circuit 174, wherein the alternating voltage generating circuit 174 may be a circuit that uses a winding transformer, a piezoelectric transformer, an LC resonance circuit, or the like and generates a radio frequency and high voltage.

Meanwhile, load circuits 12 (see FIG. 4) of the target objects 10 to be charged (see FIG. 4) may include a rectification smoothing circuit and a low voltage circuit operated with an output voltage of the rectification smoothing circuit.

As such, a power transmitting system is on the basis of the principle of short-range energy transmission using a variable electromagnetic field, and since a quasi-static electric field is bounded in the proximity of an electric field generating source, radiometric quantity far from the electric field generating source is negligible.

As described above, since the second case portion 140 of the case part 120 is coupled to the first case portion 130 so as to be slidable and movable, a plurality of objects (e.g., two smartphones) or a large object to be charged (e.g., a tablet) may be charged when the first case portion 130 and the second case portion 140 are disposed to be in parallel to each other.

Further, when the first case portion 130 and the second case portion 140 are disposed to be overlapped with each other, charging speed of the object to be charged may be improved.

Hereinafter, an operation of the wireless charging device according to an exemplary embodiment of the present disclosure will be described with reference to the accompanying drawings.

Figure 4:
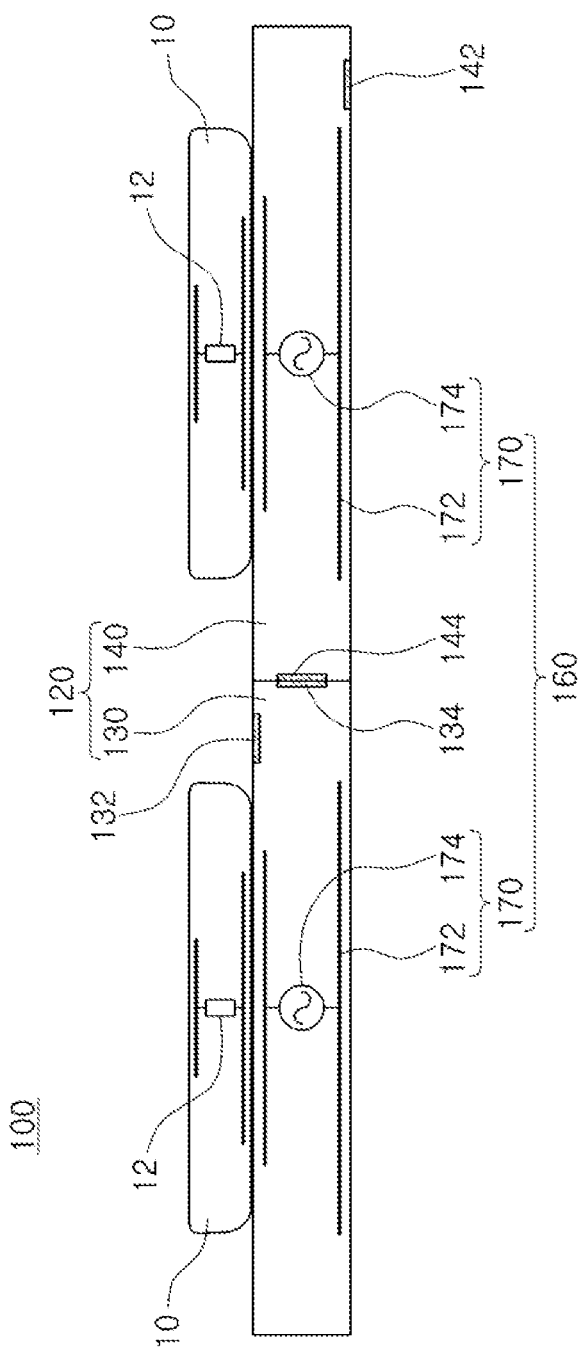
FIGS. 4 and 5 are views illustrating the operation of a wireless charging device when case portions are disposed to be in parallel to each other, according to an exemplary embodiment of the present disclosure.
Figure 5:
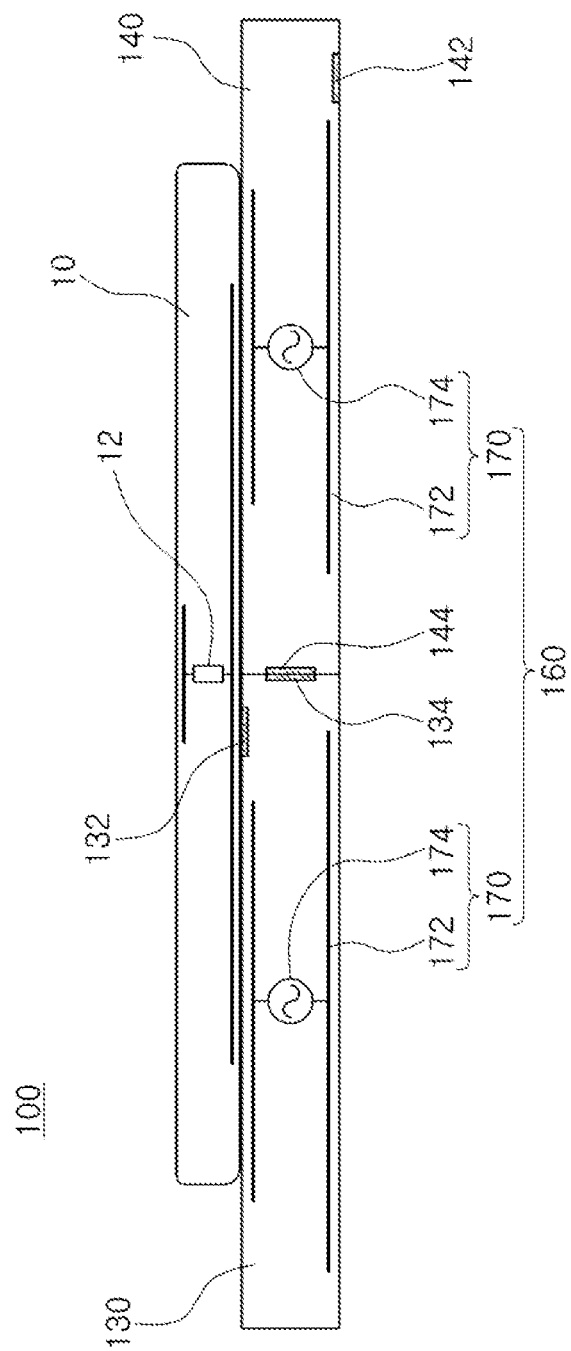
Figure 6:
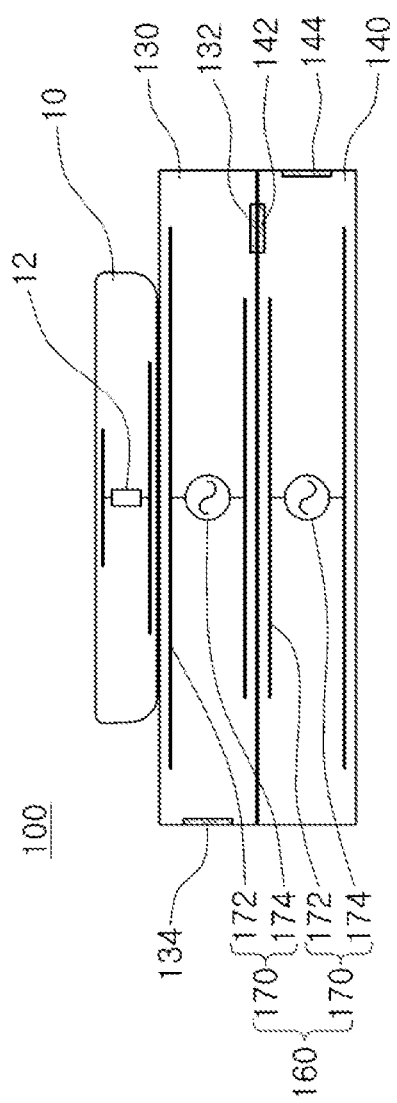
FIG. 6 is a view illustrating the operation of a wireless charging device when case portions are disposed to be overlapped with each other, according to an exemplary embodiment of the present disclosure.

FIGS. 4 and 5 are views illustrating the operation of the wireless charging device when the case portions are disposed to be in parallel to each other, according to an exemplary embodiment of the present disclosure and FIG. 6 is a view illustrating the operation of the wireless charging device when the case portions are disposed to be overlapped with each other, according to an exemplary embodiment of the present disclosure.

First, when a user intends to charge a plurality of target objects, as shown in FIG. 4, the first and second case portions 130 and 140 may be disposed to be in parallel to each other by sliding and moving the second case portion 140.

Next, one object to be charged may be seated on the top surface of the first case portion 130 and the other object to be charged may be seated on the top surface of the second case portion 140.

In addition, as shown in FIG. 5, when a size of the object to be charged is large (in other words, when the object to be charged is the tablet), after the object to be charged is seated on the top surfaces of the first and second case portions 130 and 140 which are disposed to be in parallel to each other, the object to be charged may be charged.

Meanwhile, when the first and second case portions 130 and 140 are intended to be disposed to be overlapped with each other, the user may slide and move the second case portion 140 from the first case portion 130.

Therefore, the first and second case portions 130 and 140 may be disposed to be overlapped with each other. The wireless charging device 100 having a reduced volume as described above may be easily portable.

In addition, when a quick charging of the object is intended, as shown in FIG. 6, the first and second case portions 130 and 140 may be disposed to be overlapped with each other.

In this case, as shown in FIG. 6, the power supplying electrode 172 included in the first case portion 130 and the power supplying electrode 172 included in the second case portion 140 are disposed to be overlapped with each other in the same direction.

Therefore, since magnitude of the supplied electric field is increased, the quick charging may be performed.

Hereinafter, a wireless charging device according to another exemplary embodiment of the present disclosure will be described with reference to the accompanying drawings. However, a detail description of the same components as the above-mentioned components will be replaced by the above description and be omitted below.

Figure 7:
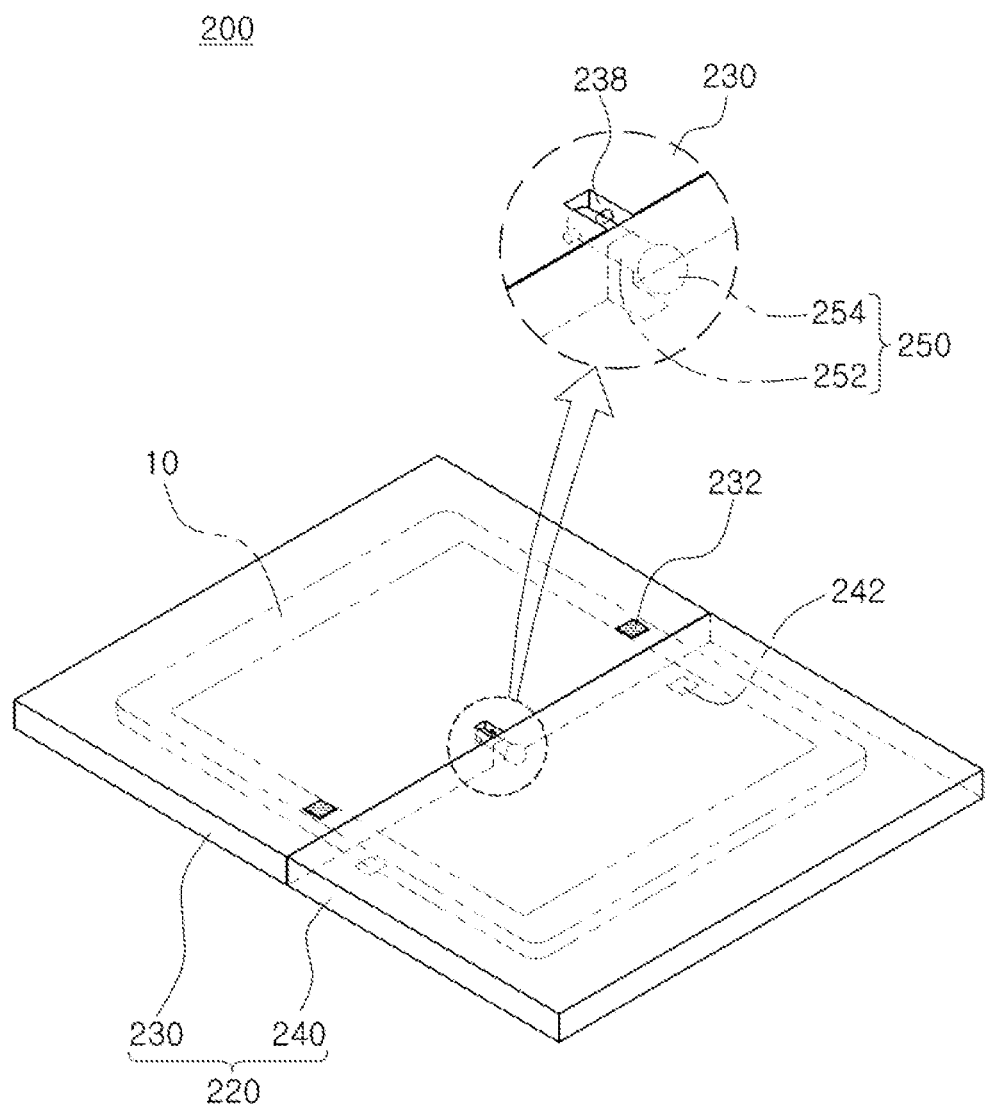
FIG. 7 is a schematic perspective view of a wireless charging device according to another exemplary embodiment of the present disclosure.

FIG. 7 is a schematic perspective view of a wireless charging device according to another exemplary embodiment of the present disclosure.

Referring to FIG. 7, a wireless charging device 200 according to another exemplary embodiment of the present disclosure may include a case part 220 and a power supply part 160 (see FIG. 3), by way of example.

Since the power supply part 160 has the same configuration as the configuration included in the wireless charging device 100 according to an exemplary embodiment of the present disclosure described above, a detailed description thereof will be omitted and be replaced by the above-mentioned description.

The case part 220 may include at least two case portions, wherein the case portions are configured to be overlapped with each other.

By way example, the case part 220 may include first and second case portions 230 and 240. That is, the case part 220 may include the first case portion 230 in which a connection wire (not shown) for making a connection with an external power source is installed, and the second case portion 240 which is rotatably installed in the first case portion 230.

The first case portion 230 may have an internal space in which a component configuring the power supply part 160 may be installed. In addition, a top surface of the first case portion 230 may be formed to be flat so that target objects (e.g., smartphones, tablets, and the like) to be charged may be seated and installed. By way example, the first case portion 230 may have a rectangular parallelepiped shape.

Meanwhile, when the second case portion 240 is disposed on the first case portion 230 so as to be overlapped with the first case portion 230, the top surface of the first case portion 230 may be provided with a first connection electrode 232 to form an electrical connection with the second case portion 240.

In addition, when the second case portion 240 is disposed to be in parallel to the first case portion 230, one side surface of the first case portion 230 may be provided with a second connection electrode 234 to form an electrical connection with the second case portion 240.

That is, when the second case portion 240 is disposed on the first case portion 230, the first and second case portions 230 and 240 may be electrically connected to each other through the first connection electrode 232, and when the first case portion 230 and the second case portion 240 are disposed to be in parallel to each other, the first and second case portions 230 and 240 may be electrically connected to each other through the second connection electrode 234.

Meanwhile, one side surface of the first case portion 230 may be provided with a coupling groove for a coupling to the second case portion 240. The coupling groove may be a configuration for fixing the second case portion 240 and a detailed description thereof will be provided below.

In addition, one end portion of the first case portion 230 may be provided with an installation groove 238 for installing a connection member 250 for making a connection with the second case portion 240.

The second case portion 240 may also have an internal space in which a component configuring the power supply part 160 may be installed. In addition, a top surface of the second case portion 240 may also be formed to be flat and the second case portion 240 may have a rectangular parallelepiped shape, by way of example. In addition, the first and second case portions 230 and 240 may have the same size and shape as each other.

Meanwhile, the second case portion 240 may be provided with first and second connecting electrodes 242 and 244 corresponding to the first and second connection electrodes 232 and 234 of the first case portion 230 described above. That is, when the first case portion 230 is disposed to be overlapped with the second case portion 240 under the second case portion 240, a bottom surface of the second case portion 240 may be provided with the first connecting electrode 242 connected to the first connection electrode 232 of the first case portion 230.

In addition, when the first case portion 230 is disposed to be in parallel to the second case portion 240, one side surface of the second case portion 240 may be provided with the second connecting electrode 244 connected to the second connection electrode 234 of the first case portion 230.

In addition, when the first case portion 230 and the second case portion 240 are disposed to be overlapped with each other, the first and second case portions 230 and 240 may be electrically connected to each other through the first connection electrode 232 and the first connecting electrode 242, and when the first case portion 230 and the second case portion 240 are disposed to be in parallel to each other, the first and second case portions 230 and 240 may be electrically connected to each other through the second connection electrode 234 and the second connecting electrode 244.

In addition, the second case portion 240 may be provided with a circular insertion groove (not shown) and a detailed description thereof will be provided below.

In addition, the first case portion 230 and the second case portion 240 may be assembled to each other by the connection member 250. Meanwhile, the connection member 250 may include an extension bar 252 having one end which is rotatably installed in the first case portion 230, and an insertion part 254 formed on the other end of the extension bar 252 and disposed to be inserted into the second case portion 240.

A detailed description thereof will be provided below. One end of the extension bar 252 may be installed so as to be insertedly disposed in the installation groove 238 of the first case portion 230 and may be rotatably installed in the first case portion 230. That is, one end of the extension bar 252 may be rotated in the installation groove 238.

Meanwhile, the circular insertion part 254 may be disposed to be inserted into the insertion groove (not shown) of the second case portion 240 and the second case portion 240 may be coupled to the circular insertion part 254, so as to be freely rotated.

Figure 8:
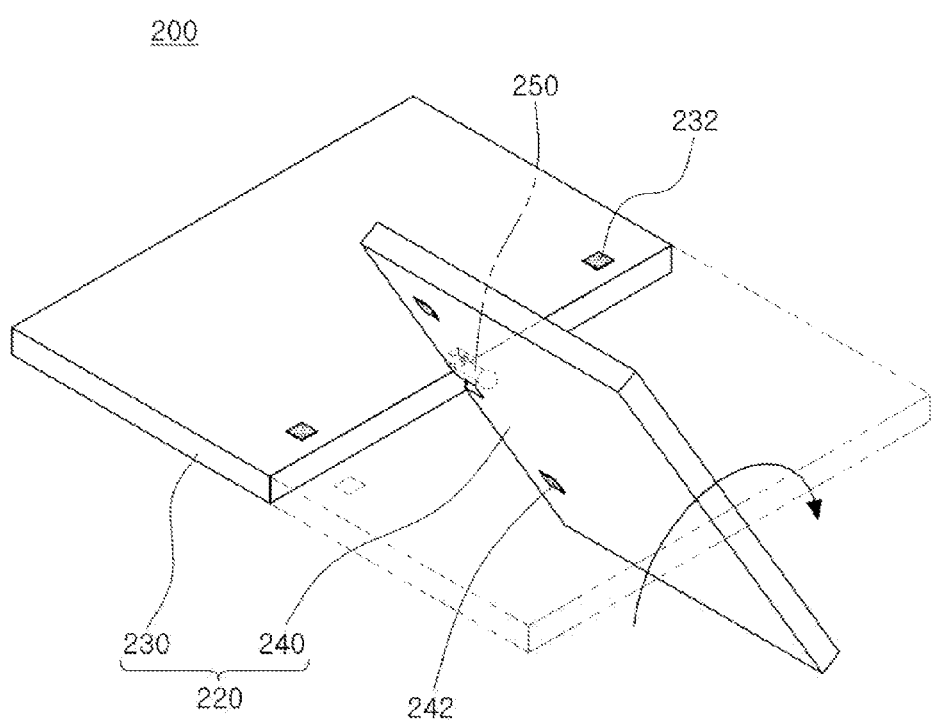
FIGS. 8 through 10 are views illustrating the operation of the wireless charging device according to another exemplary embodiment of the present disclosure.
Figure 9:
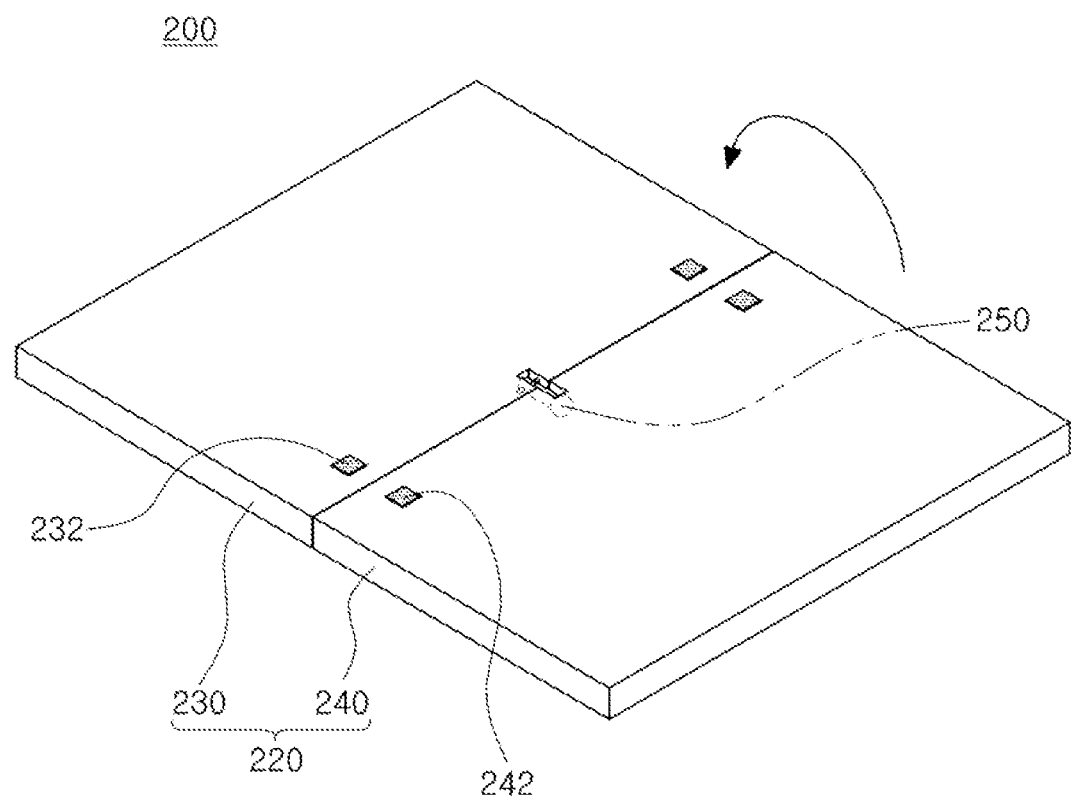
Figure 10:
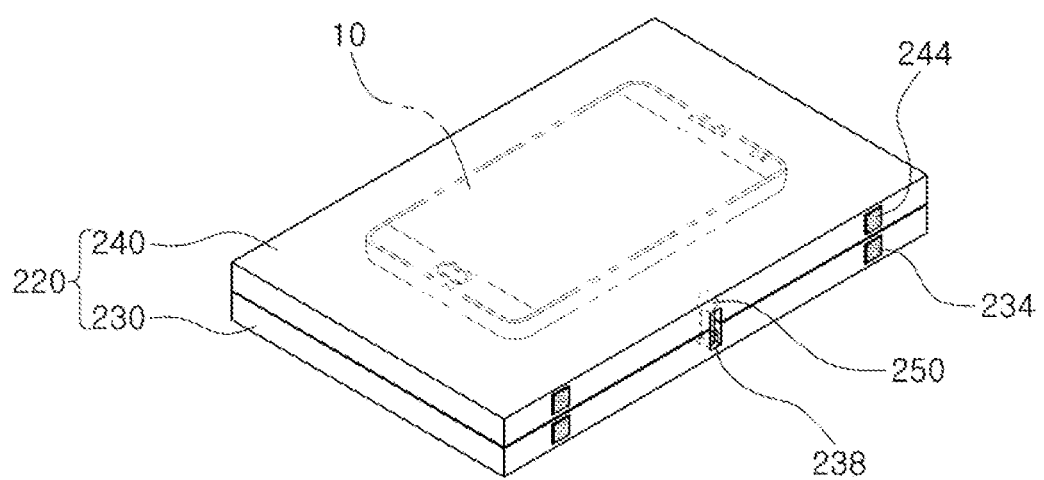

FIGS. 8 through 10 are views illustrating the operation of the wireless charging device according to another exemplary embodiment of the present disclosure.

As shown in FIG. 7, the first and second case portions 230 and 240 may be disposed to be in parallel to each other. In this case, a wireless charging may be performing by seating two target objects on the first and second case portions 230 and 240, respectively.

In addition, when the first and second case portions 230 and 240 are intended to be disposed to be overlapped with each other in a state in which the first and second case portions 230 and 240 are disposed to be in parallel to each other, the user may rotate the connection member 250 and rotate the second case portion 240 from the circular insertion part 254 at the same time, as shown in FIGS. 8 and 9.

As such, after the power supply unit 170 included in the first case portion 230 and the power supplying electrode 172 included in the second case portion 240 are disposed to be overlapped with each other in the same direction as shown in FIG. 10 by rotating the second case portion 240 on two shafts, the wireless charging may be performed.

Therefore, since magnitude of the supplied electric field is increased, the quick charging may be performed.

As described above, since the first and second case portions 230 and 240 are configured to be overlapped with each other, the wireless charging device may be easily portable and the charging time may be shortened.

As set forth above, according to exemplary embodiments of the present disclosure, the wireless charging device may be easily portable and improve charging efficiency.

While exemplary embodiments have been shown and described above, it will be apparent to those skilled in the art that modifications and variations could be made without departing from the scope of the present invention as defined by the appended claims.

What is claimed is:

1. A wireless charging device comprising:
a case part including at least two case portions, which are configured to overlap each other; and
a power supply part including power supply units respectively disposed in the case portions, wherein a charging between the power supply part and at least one target object is performed using a quasi-static electric field generated by at least one power supply unit of the power supply units,
wherein power supply electrodes of the power supply units are disposed to overlap each other, and are configured to increase a magnitude of the generated electric field to enable quick charging.

2. The wireless charging device of claim 1, wherein the case part includes:
a first case portion comprising a connection wire configured to connect the first case portion with an external power source; and
a second case portion which is installed to be slidable and movable with respect to the first case portion.

3. The wireless charging device of claim 2,
wherein in the case that the second case portion is disposed to overlap the first case portion, a top surface of the first case portion comprising a first connection electrode to form an electrical connection with the second case portion, and wherein in the case that the second case portion is disposed to be in parallel to the first case portion, one side surface of the first case portion comprising a second connection electrode to form an electrical connection with the second case portion.

4. The wireless charging device of claim 3, wherein the second case portion comprises first and second connecting electrodes corresponding to the first and second connection electrodes.

5. The wireless charging device of claim 2,
wherein the first case portion includes a guide bar to guide sliding movement of the second case portion, and
wherein the guide bar comprises a guide groove configured to guide a movement of a protrusion of the second case portion.

6. The wireless charging device of claim 2, wherein the first case portion and the second case portion are coupled to each other by a connection member, and
the second case portion is rotatably coupled to the connection member.

7. The wireless charging device of claim 6, wherein the connection member includes:
an extension bar of which one end is installed to be rotatable in one direction in the first case portion; and
a circular insertion part provided on the other end of the extension part and disposed to be inserted into the second case portion.

8. The wireless charging device of claim 7, wherein the first case portion comprises an installation groove in which the extension bar is rotatably installed, and
the second case portion comprises an insertion groove into which the circular insertion part is inserted.

9. The wireless charging device of claim 6, wherein the second case portion is rotated to be unfolded from the first case portion and is then rotated 180 degrees, so as to be disposed to be in parallel to the first case portion.

10. A wireless charging device comprising:
a first case portion comprising a connection wire configured to connect the first case portion with an external power source;
a second case portion coupled to the first case portion and configured to overlap the first case portion; and
a power supply part including power supply units respectively installed in the first and second case portions,
wherein the power supply units include power supply electrodes configured to charge at least one target object, wherein a charging between the power supply part and at least one target object is performed using a quasi-static electric field generated by at least one power supply unit of the power supply units, and
wherein, to enable quick charging, each of the power supply electrodes is configured to charge the at least one target object when the second case portion overlaps the first case portion.

11. A wireless charging device comprising:
a case part including at least two case portions which are configured to be overlapped with each other; and
a power supply part including power supply units disposed in the case portions, respectively,
wherein when the case portions are overlapped with each other, power supply electrodes of the power supply units are disposed to be overlapped with each other, so as to charge at least one target object,
wherein the first case portion and the second case portion are coupled to each other by a connection member, and the second case portion is rotatably coupled to the connection member, and wherein the connection member includes:
  an extension bar of which one end is installed to be rotatable in one direction in the first case portion, and
  a circular insertion part provided on the other end of the extension part and disposed to be inserted into the second case portion.

12. The wireless charging device of claim 11, wherein the first case portion comprises an installation groove in which the extension bar is rotatably installed, and
  the second case portion comprises an insertion groove into which the circular insertion part is inserted.

* * * * *